(12) United States Patent
Lin

(10) Patent No.: US 11,280,339 B2
(45) Date of Patent: Mar. 22, 2022

(54) HORIZONTAL AUTOMATIC SUBMERSIBLE PUMP

(71) Applicant: FUJIAN AIDI ELECTRIC CO., LTD., Longyan (CN)

(72) Inventor: Xi Zhen Lin, Xiamen (CN)

(73) Assignee: FUJIAN AIDI ELECTRIC CO., LTD., Longyan (CN)

( * ) Notice: Subject to any disclaimer, the term of this patent is extended or adjusted under 35 U.S.C. 154(b) by 0 days.

(21) Appl. No.: 17/006,895

(22) Filed: Aug. 31, 2020

(65) Prior Publication Data
US 2022/0018350 A1 Jan. 20, 2022

(30) Foreign Application Priority Data

Jul. 16, 2020 (CN) .......................... 202010686491.5

(51) Int. Cl.
| | |
|---|---|
| *F04D 13/08* | (2006.01) |
| *F04D 15/02* | (2006.01) |
| *F04D 29/42* | (2006.01) |
| *F04D 29/70* | (2006.01) |
| *F04D 29/22* | (2006.01) |
| *F04D 13/06* | (2006.01) |
| *G01F 23/263* | (2022.01) |

(52) U.S. Cl.
CPC ....... *F04D 13/086* (2013.01); *F04D 13/0693* (2013.01); *F04D 15/0218* (2013.01); *F04D 29/22* (2013.01); *F04D 29/4293* (2013.01); *F04D 29/708* (2013.01); *G01F 23/263* (2013.01); *G01F 23/265* (2013.01); *G01F 23/266* (2013.01); *G01F 23/268* (2013.01); *F04D 13/08* (2013.01)

(58) Field of Classification Search
CPC .............. F04D 15/0218; F04D 13/086; F04D 13/0686; F04D 13/08; F04D 13/0693; F04D 29/22; F04D 29/4293; F04D 29/708; G01F 23/266; G01F 23/265; G01F 23/268; G01F 23/263
See application file for complete search history.

(56) References Cited

U.S. PATENT DOCUMENTS 5,856,783 A * 1/1999 Gibb ..................... G01F 23/265
340/618
9,810,241 B2 * 11/2017 Gell, III .............. F04D 29/4293

* cited by examiner

*Primary Examiner* — Peter J Bertheaud
(74) *Attorney, Agent, or Firm* — Bayramoglu Law Offices LLC

(57) ABSTRACT

A horizontal automatic submersible pump includes a capacitive liquid level sensor, a circuit board and a motor. The capacitive liquid level sensor is arranged inside a casing of the horizontal automatic submersible pump. The capacitive liquid level sensor is configured to detect a liquid level outside the casing of the horizontal automatic submersible pump. The output terminal of the capacitive liquid level sensor is connected to the input terminal of the circuit board. The control terminal of the motor is connected to the output terminal of the circuit board. The circuit board is configured to control the motor to work or stop according to a detection signal of the capacitive liquid level sensor. The horizontal automatic submersible pump starts and stops automatically, and the capacitive liquid level sensor means there are fewer moving parts, which makes the pump less expensive to manufacture, more dependable and longer lasting.

8 Claims, 7 Drawing Sheets

HORIZONTAL AUTOMATIC SUBMERSIBLE PUMP

CROSS REFERENCE TO THE RELATED APPLICATIONS

This application is based upon and claims priority to Chinese Patent Application No. 202010686491.5, filed on Jul. 16, 2020, the entire contents of which are incorporated herein by reference.

TECHNICAL FIELD

The present invention belongs to the technical field of water pumps, and more particularly, relates to a horizontal automatic submersible pump.

BACKGROUND

A submersible pump is a versatile tool for water treatment and differs from an ordinary pump in that a submersible pump is designed for use underwater. Submersible pumps can be divided into vertical submersible pumps and horizontal submersible pumps, and horizontal submersible pumps exhibit better draining effect when compared with vertical submersible pumps. The horizontal submersible pump generally includes a pump body, a motor and an impeller. The pump body is provided with a water inlet and a water outlet. The motor is activated to drive the impeller to rotate so that water is driven to enter from the water inlet, and then discharged from the water outlet. The hollow part inside the pump body forms a water flow channel. Before activating the pump, the suction pipe and pump must be filled with fluid. After activating the pump, the impeller rotates at a high speed. The fluid inside rotates with the blades and is separated from the impeller under centrifugal action and ejected outwards. The ejected fluid in the diffusion chamber of the pump casing gradually slows down with increasing pressure, and then flows out of the water outlet by way of the pump's discharge pipe. A vacuum low-pressure zone with neither air nor fluid is formed at the center of the blades since the fluid is made turbulent inside the pump body. The fluid of the liquid pool in which the pump is submersed flows into the pump through the suction pipe as a result of the atmospheric pressure of the pool surface. In such a way, the fluid is continuously pumped from the liquid pool and then continuously flows out of the discharge pipe.

Horizontal submersible pumps are typically activated and stopped by manual control of a power switch to avoid continuous running of the submersible pump. When the water level relative to the submersed pump drops to a height that is lower than the pump's intake suction pipe, the submersible pump takes in air and operates without its body being completely filled with water. As a result, the seals are damaged, and water infiltrates into the motor, causing the motor to burn out. In order to solve this problem, some automatic submersible pumps have been developed, whereby the start and stop of the submersible pump can be automatically controlled according to the water level, which improves the pump's wear and reliability.

In a majority of existing automatic submersible pumps, however, the start and stop of the submersible pump are controlled according to the height to which a float rises or drops. When the water level rises to a certain height, the float drives the rotor, the rotor drives the switch to conduct two silver contacts of the switch, and the submersible pump is energized and starts pumping. When the water level drops to a certain height, the float drives the rotor, the rotor drives the switch to disconnect the two silver contacts of the switch, and the water pump is stopped. In such a control structure, however, the switch shrapnel is prone to heating up and deforming to induce a failure. Moreover, the float is likely to be stuck when the water level rises or drops, increasing wear and pump reliability. In addition, the structure is complex with too many moving parts, sensitive to operate effectively on the work site, and expensive to manufacture.

SUMMARY

To solve the above-mentioned technical problems, an objective of the present invention is to provide a horizontal automatic submersible pump.

In order to achieve the above-mentioned objective, the present invention adopts the following technical solution. A horizontal automatic submersible pump includes a capacitive liquid level sensor, a circuit board and a motor. The capacitive liquid level sensor is arranged inside a casing of the horizontal automatic submersible pump. The capacitive liquid level sensor is configured to detect a liquid level outside the casing of the horizontal automatic submersible pump. The output terminal of the capacitive liquid level sensor is connected to the input terminal of the circuit board. The control terminal of the motor is connected to the output terminal of the circuit board. The circuit board is configured to control the motor to work or stop according to a detection signal of the capacitive liquid level sensor.

Further, the number of the capacitive liquid level sensors is two, and the two capacitive liquid level sensors are configured to detect a stop water level and a start water level, respectively. The capacitive liquid level sensors are arranged on the circuit board.

Further, the horizontal automatic submersible pump includes a filter suction head assembly, a pump chamber assembly and a motor assembly. The pump chamber assembly is provided with a first water inlet and a mounting port in fluid communication with the pump chamber. The filter suction head assembly is arranged on the first water inlet of the pump chamber assembly. The capacitive liquid level sensor, the circuit board and the motor are arranged inside the motor assembly. The motor assembly is hermetically arranged on the mounting port, and an impeller of the motor assembly extends into the pump chamber. The pump chamber assembly includes a pump chamber housing and a pump base. The pump chamber housing is provided with a first water outlet in fluid communication with the pump chamber. The pump chamber housing is arranged on the pump base and can rotate relative to the pump base to adjust a direction of the first water outlet.

Furthermore, the pump base is provided with a through mounting cavity with two ends, and one end of the pump chamber housing is rotatably installed in the mounting cavity.

Furthermore, the pump chamber housing and the pump base are connected by a buckle.

Further, the filter suction head assembly is provided with a second water outlet and a second water inlet. The second water outlet of the filter suction head assembly is hermetically connected to the first water inlet of the pump chamber assembly. The filter suction head assembly can rotate relative to the pump chamber assembly to adjust a direction of the second water inlet.

Furthermore, the filter suction head assembly is detachably snap-fitted with the pump chamber assembly.

Further, the water inlet of the filter suction head assembly is provided with a filter screen, and the filter screen has a curved structure.

Further, the filter suction head assembly is provided with a cavity in fluid communication with the second water outlet and the second water inlet. An exhaust hole is formed on the cavity wall at the top of the cavity. The exhaust hole is provided with a one-way air outlet valve structure.

Further, the motor assembly is detachably and hermetically arranged on the mounting port.

Furthermore, the motor assembly is snap-fitted with the pump base, and detachably and hermetically arranged on the mounting port.

Further, a quick connector is provided on the first water outlet.

The advantages of the present invention are as follows.

1. The horizontal automatic submersible pump of the present invention can start and stop automatically, which is convenient to use and has high safety. A capacitive liquid level sensor is employed, simplifying structure and facilitating implementation. Moreover, the horizontal automatic submersible pump is less expensive, highly reliable and suitable for long-term use.

2. Both the pump chamber housing and the filter suction head assembly of the present invention can be rotated 360 degrees, which facilitates adjusting the directions of the water inlet and the water outlet, and is convenient to use.

3. The filter suction head assembly, the pump chamber assembly and the motor assembly of the present invention are detachable and thus are convenient to assemble and disassemble, which facilitates the cleaning operation and replacement of accessories.

BRIEF DESCRIPTION OF THE DRAWINGS

In order to more clearly describe the technical solutions in the embodiments of the present invention, the drawings used in the description of the embodiments will be briefly introduced. Obviously, the drawings in the following description are only some embodiments of the present invention. For those having ordinary skill in the art, other drawings can be obtained based on these drawings without creative efforts.

DETAILED DESCRIPTION OF THE EMBODIMENTS

Figure 1:
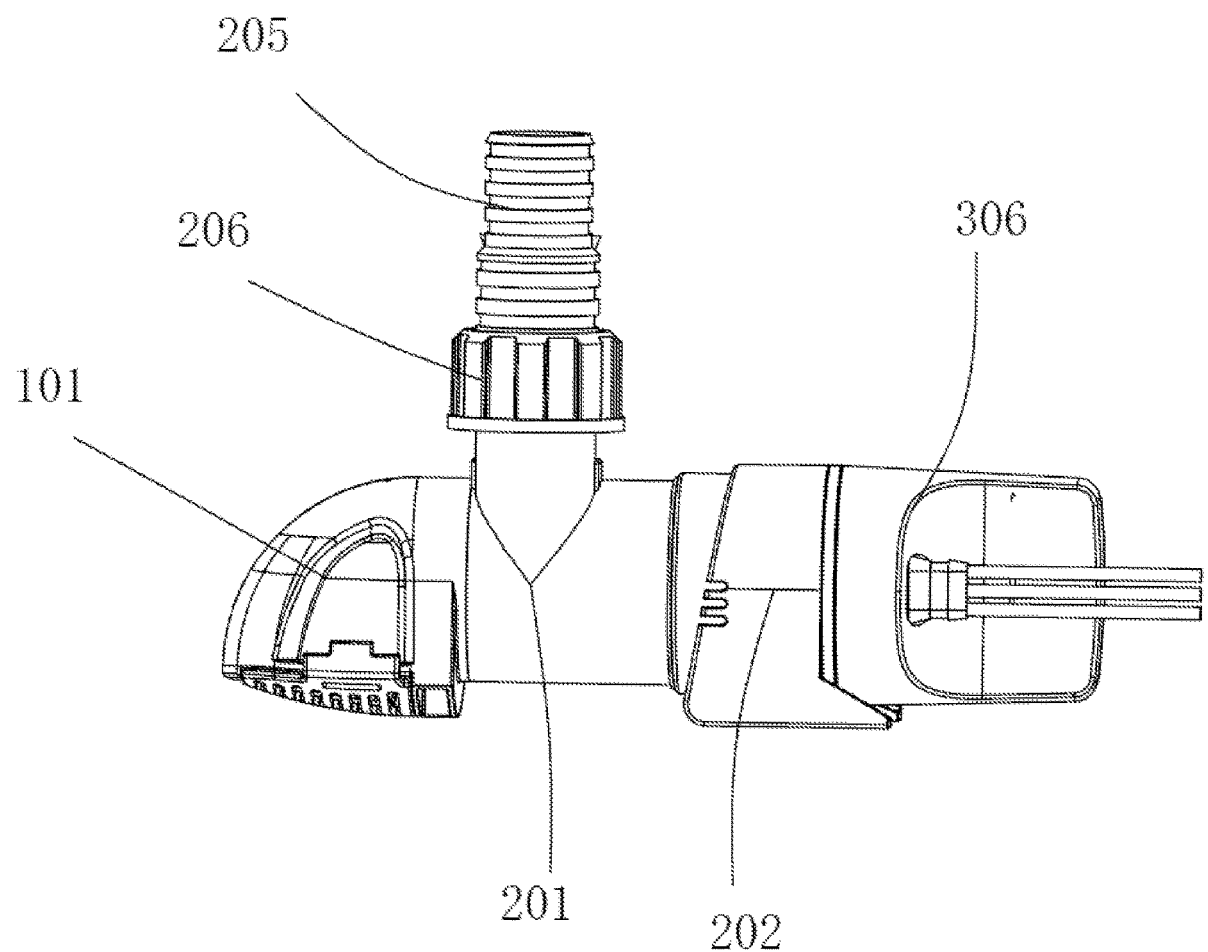
FIG. 1 is a structural diagram of a specific embodiment of the present invention.
Figure 2:
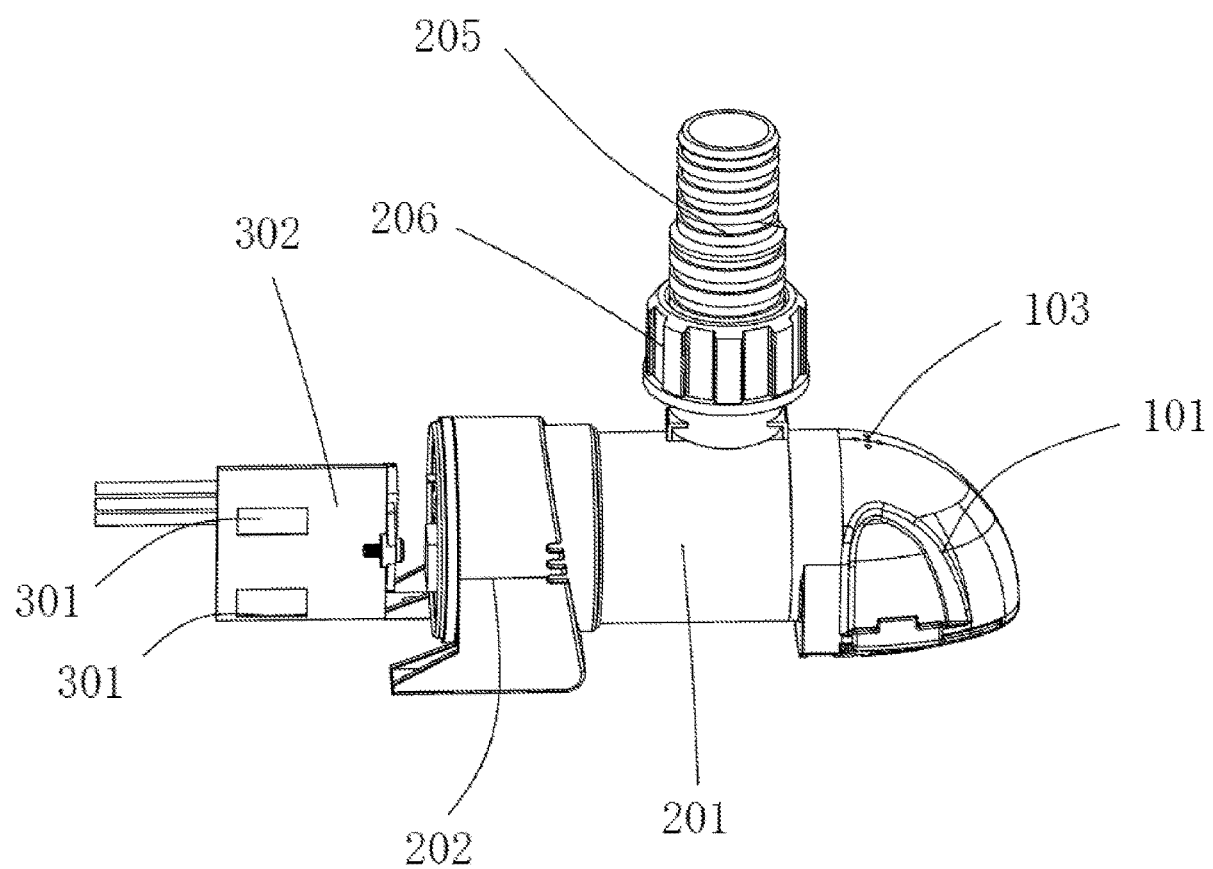
FIG. 2 is another structural view of the specific embodiment of the present invention.

The various embodiments will be further illustrated with reference to the drawings of the present invention. These drawings are a part of the disclosure of the present invention and mainly used to illustrate the embodiments, and can cooperate with the relevant description in the specification to explain the operating principles of the embodiments. With reference to these contents, those having ordinary skill in the art can understand other feasible implementations and advantages of the present invention. The components in the figures are not drawn to scale, and similar component symbols are generally used to indicate similar components.

The present invention will be further described with reference to the drawings and specific embodiments.

As shown in FIGS. 1-7, a horizontal automatic submersible pump includes the filter suction head assembly 100, the pump chamber assembly 200 and the motor assembly 300. The pump chamber assembly 200 is provided with the first water inlet 2011, the first water outlet 2013, and the mounting port 2012 that are in fluid communication with the pump chamber. The filter suction head assembly 100 is arranged on the first water inlet 2011 of the pump chamber assembly 200. The motor assembly 300 is hermetically arranged on the mounting port 2012, and the impeller 304 of the motor assembly 300 extends into the pump chamber 2014.

In the present embodiment, the motor assembly 300 includes the capacitive liquid level sensor 301, the circuit board 302, the motor 303, the motor cover 305, and the motor rear housing 306. The rear end (the right end in FIG. 1) of the motor cover 305 is provided with an opening, and the motor rear housing 306 hermetically covers the opening of the motor cover 305.

Preferably, in the present embodiment, the motor rear housing 306 and the motor cover 305 are sealed together in water-tight fashion using means known by skilled artisans. More preferably, the housing 306 and over 305 are ultrasonically welded and fixed by the double ultrasonic wire structure 307 to obtain an improved waterproof effect. In other embodiments, the motor rear housing 306 and the motor cover 305 can also be hermetically fixed by other fixing methods.

The capacitive liquid level sensor 301, the circuit board 302 and the motor 303 are arranged inside the motor rear housing 306 and the motor cover 305. The capacitive liquid level sensor 301 is configured to detect the liquid level outside the casing of the horizontal automatic submersible pump. The output terminal of the capacitive liquid level sensor 301 is connected to the input terminal of the circuit board 302. The control terminal of the motor 303 is connected to the output terminal of the circuit board 302. The circuit board 302 is configured to control the motor 303 to work or stop according to the detection signal of the capacitive liquid level sensor 301. In this way, the horizontal automatic submersible pump can start and stop automatically, which is convenient to use and has high safety. The capacitive liquid level sensor is employed, simplifying structure and facilitating implementation. Moreover, the horizontal automatic submersible pump is less expensive, highly reliable and suitable for long-term use. In addition, the capacitive liquid level sensor 301 is arranged inside the motor assembly 300 and has a simple circuit structure, which is easy to assemble and seal, and manufacturing cost is also reduced, but not limited to this. In other embodiments, the capacitive liquid level sensor 301 can also be arranged at other suitable positions of the horizontal automatic submersible pump. The capacitive liquid level sensor 301 is any one available on the market, which can be easily achieved by those skilled in the art and thus will not be elaborated herein.

In the present embodiment, the number of the capacitive liquid level sensor 301 is two. The two capacitive liquid level sensors 301 are arranged in a vertical direction and spaced apart, and configured to detect a stop water level and a start water level, respectively, which provides more reasonable and reliable automatic control to obtain an improved effect, but is not limited to this.

In the present embodiment, the two capacitive liquid level sensors 301 are fixedly arranged on the circuit board 302, which are structurally simple, compact, and concise, and easy to assemble, but not limited to this.

The impeller 304 is arranged at the front end (the left end in FIG. 3) of the outside of the motor cover 305. The rotating shaft of the motor 303 passes through the motor cover 305 and is fixedly connected to the impeller 304. The rotating shaft of the motor 303 is sealed by the oil seal structure 308 to obtain a good sealing effect and excellent water resistance, but not limited to this.

Optionally, in other embodiments, the motor assembly 300 can also be implemented with other structures.

In the present embodiment, the pump chamber assembly 200 includes the pump chamber housing 201 and the pump base 202. The pump chamber housing 201 is provided with the first water inlet 2011, the first water outlet 2013 (that is, the water outlet of the horizontal automatic submersible pump) and the mounting port 2012 that are connected to the pump chamber 2014. The filter suction head assembly 100 is arranged on the first water inlet 2011 of the pump chamber assembly 200. The motor assembly 300 is hermetically arranged on the mounting port 2012, and the impeller 304 of the motor assembly 300 extends into the pump chamber 2014. The pump chamber housing 201 is arranged on the pump base 202 and can rotate relative to the pump base 202 to adjust the direction of the first water outlet 2013. The pump base 202 is provided with mounting holes for fixedly installing the horizontal automatic submersible pump. After mounting, the direction of the first water outlet 2013 can be adjusted by rotating the pump chamber housing 201, which is convenient to use.

In the present embodiment, the pump chamber housing 201 is a substantially cylindrical structure. The first water inlet 2011 and the mounting port 2012 are respectively arranged on two end surfaces (left and right end surfaces in FIG. 3) along the axial direction of the pump chamber housing 201. The first water outlet 2013 is arranged on the peripheral surface of the pump chamber housing 201 and has a simple and compact structure, but not limited to this.

Figure 3:
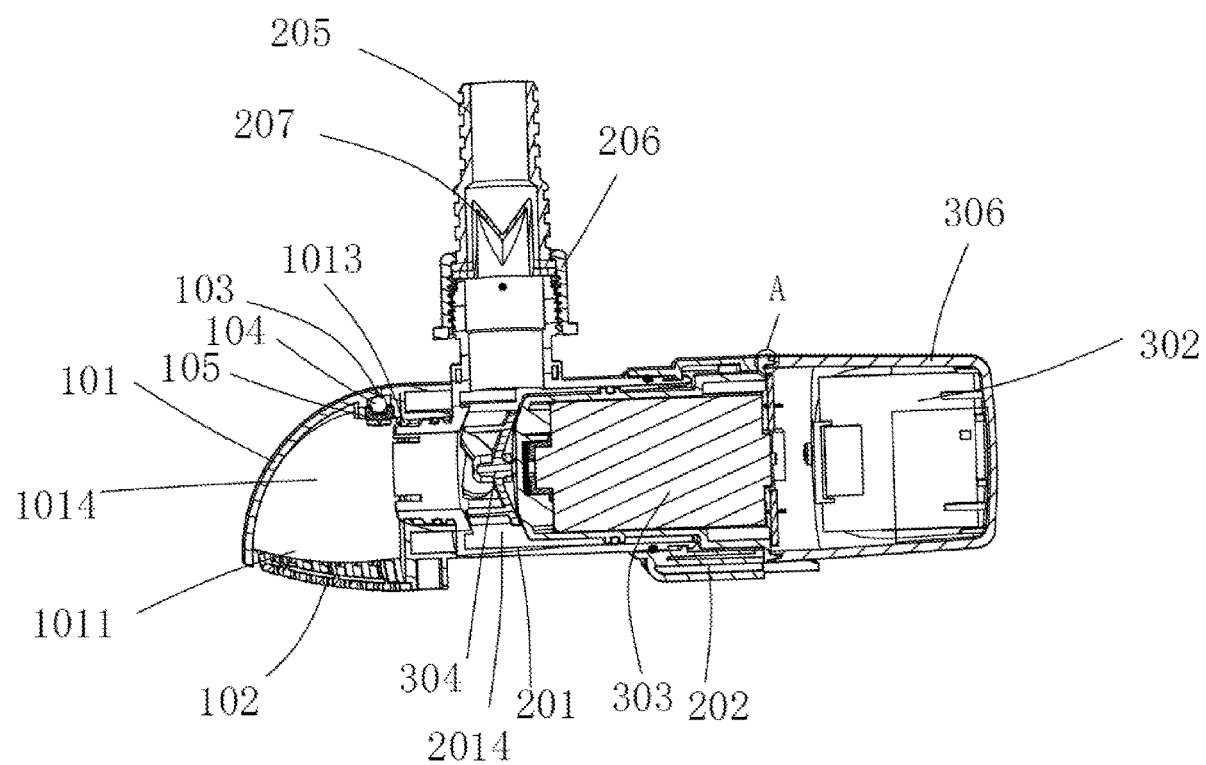
FIG. 3 is a cross-sectional view of the specific embodiment of the present invention.
Figure 4:
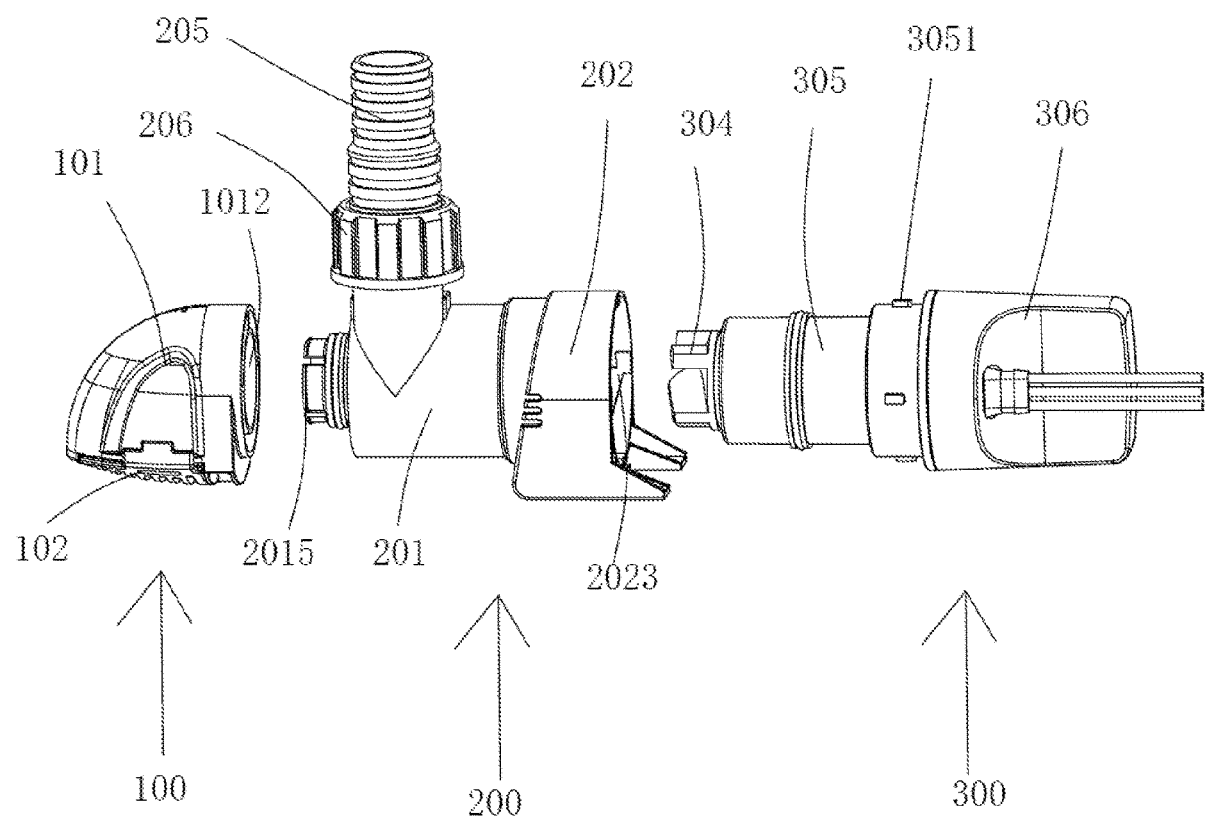
FIG. 4 is a partially exploded view of the specific embodiment of the present invention.
Figure 5:
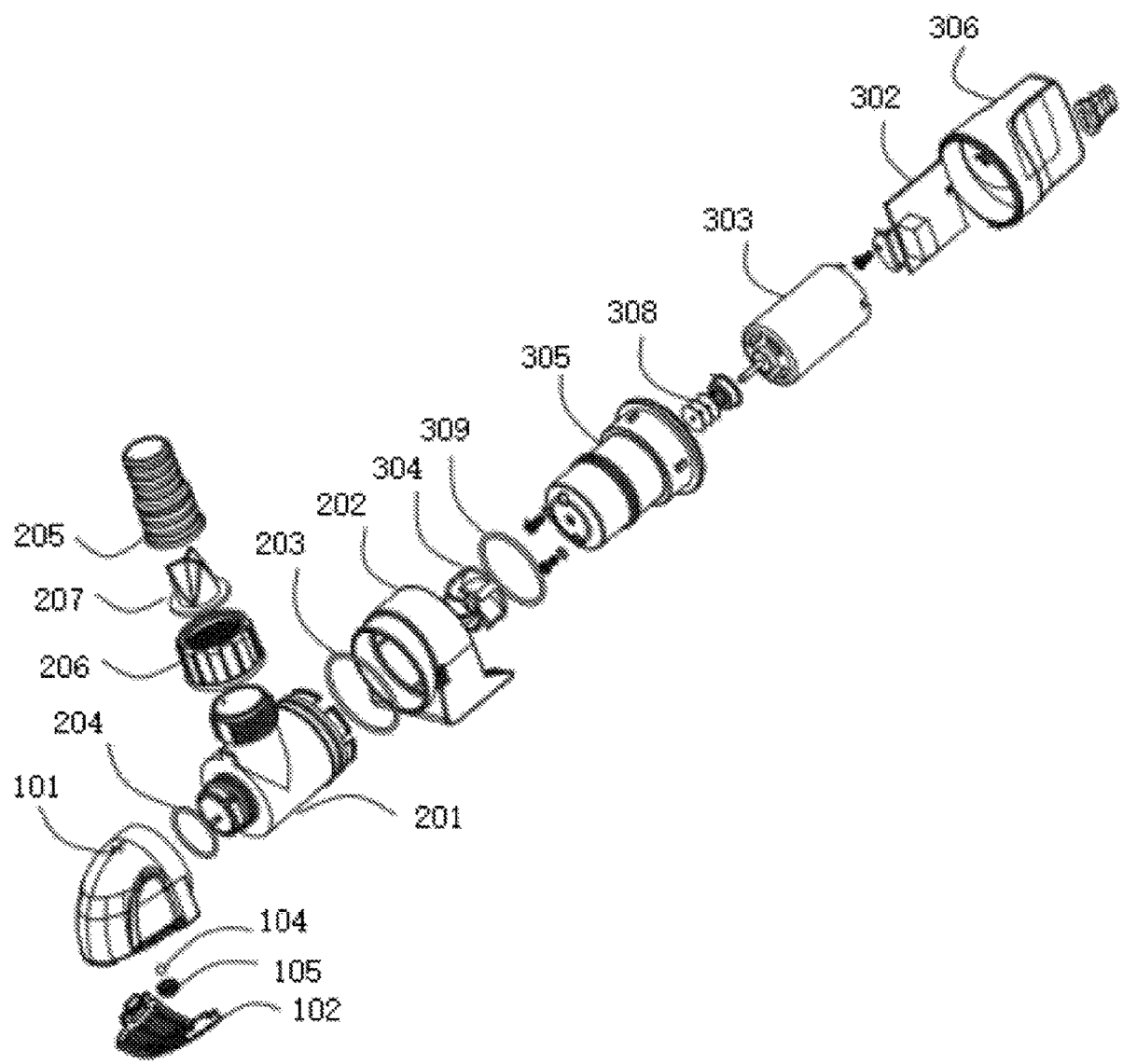
FIG. 5 is an exploded view of the specific embodiment of the present invention.
Figure 6:
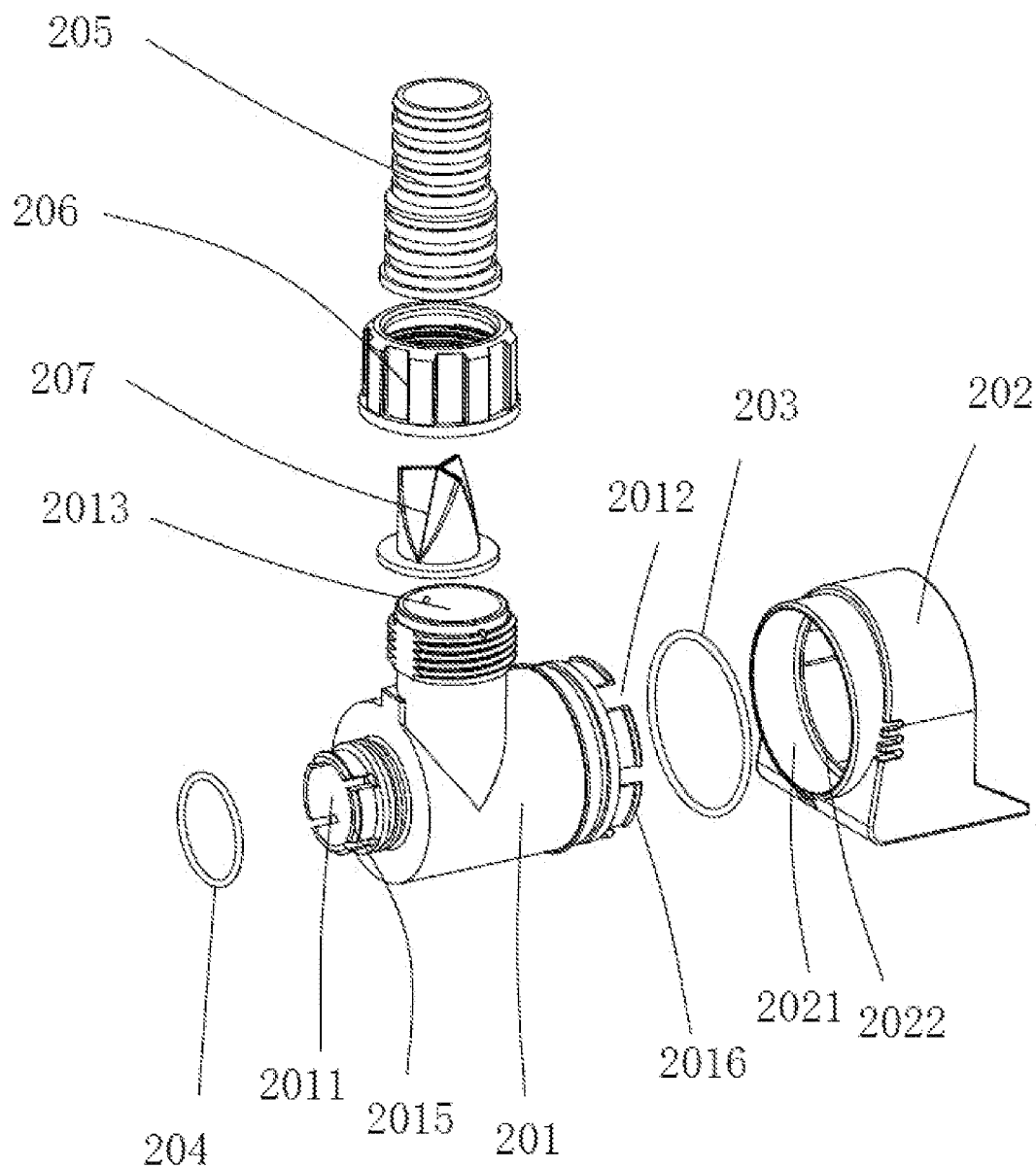
FIG. 6 is an exploded view of the pump chamber assembly of the specific embodiment of the present invention.
Figure 7:
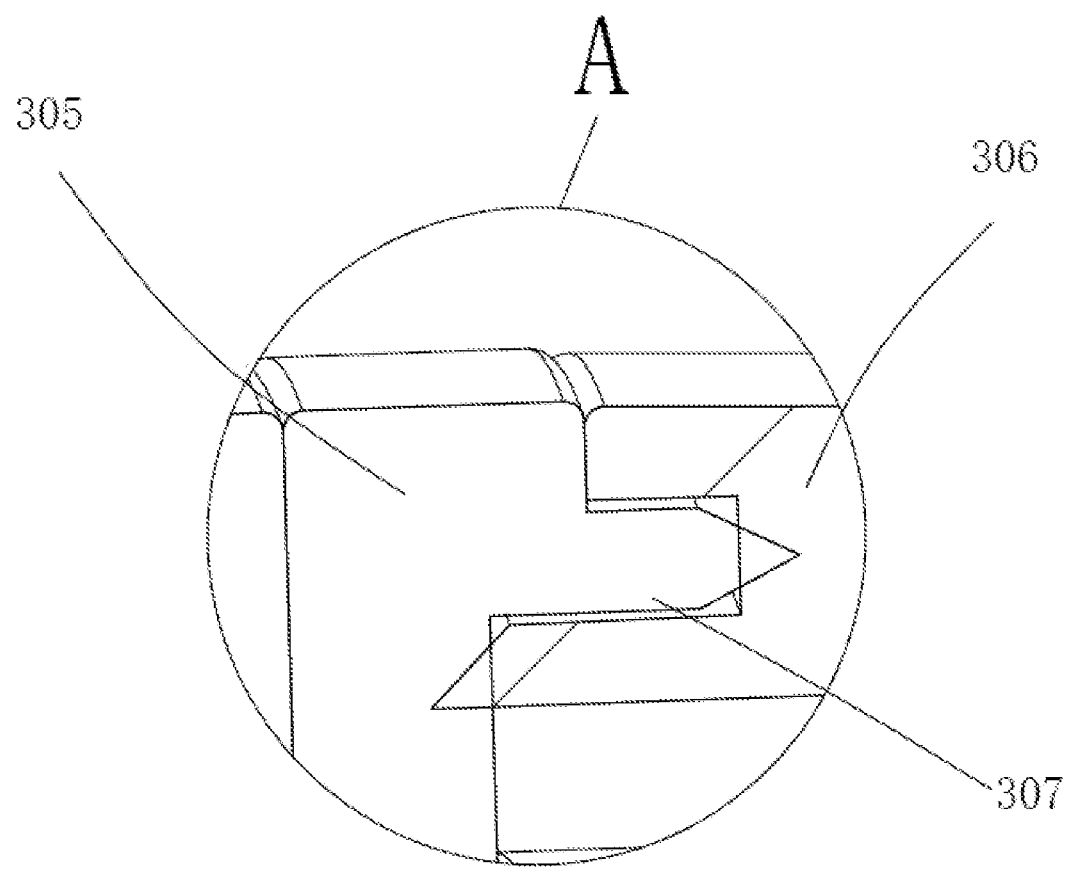
FIG. 7 is an enlarged view of portion A encircled in FIG. 3.

Specifically, in the present embodiment, the pump base 202 is provided with the through mounting cavity 2021 with two ends (left and right ends in FIG. 3). The right end of the pump chamber housing 201 is rotatably installed in the mounting cavity 2021 and can be rotated 360° freely so that the first water outlet 2013 can be rotated 360°, which has a simple and compact structure, but not limited to this.

Preferably, in the present embodiment, the pump chamber housing 201 and the pump base 202 are rotatably connected by a buckle and can be rotated 360°, which is easy to implement, and convenient to disassemble and assemble, but not limited to this. In other embodiments, other available rotatable connection structures can also be used to implement this connection.

Specifically, in the present embodiment, the right end of the pump chamber housing 201 is provided with the hook 2016. The mounting cavity 2021 is provided with the annular snap ring 2022. The pump chamber housing 201 is hooked and connected to the snap ring 2022 by the hook 2016 and can be rotated 360°, but not limited to this. In other embodiments, the pump chamber housing 201 and the pump base 202 can also be implemented by other existing buckle structures.

In the present embodiment, the right end of the pump chamber housing 201 is provided with a plurality of hooks 2016 arranged at intervals to form a ring shape, so that the connection is more secure.

In the present embodiment, the sealing ring 203 is further provided between the pump chamber housing 201 and the mounting cavity 2021 for sealing to improve the waterproof performance.

The left end of the motor assembly 300 extends into the mounting port 2012 through the mounting cavity 2021, and the impeller 304 extends into the pump chamber 2014 accordingly. The motor assembly 300 is detachably snap-fitted with the pump base 202, which facilitates assembly, disassembly, cleaning, and replacement of accessories, and has a simple structure and is easy to implement, but not limited to this.

Specifically, in the present embodiment, the motor cover 305 is provided with the engaged block 3051, and the mounting cavity 2021 is provided with the corresponding clamping slot 2023. The motor cover 305 is detachably connected to the pump base 202 by rotating the engaged block 3051 in the clamping slot 2023, but not limited to this.

The motor cover 305 and the pump chamber housing 201 are hermetically sealed by the sealing ring 309 to obtain an improved waterproof effect. In addition, the motor cover 305 and the pump chamber housing 201 can rotate relative to each other. The motor cover 305 and the pump base 202 are locked in the clamping slot 2023 by the engaged block 3051 to restrict the rotation. In this way, the rotation of the pump chamber housing 201 does not drive the motor assembly 300 to rotate and will not affect the water level detection of the capacitive liquid level sensor 301.

The filter suction head assembly 100 includes the suction head housing 101 and the filter screen 102. The suction head housing 101 is provided with the second water outlet 1012 and the second water inlet 1011 (the water inlet of the horizontal automatic submersible pump). The second water outlet 1012 is provided on the right end surface of the suction head housing 101. The second water inlet 1011 is provided on the bottom surface of the suction head housing 101. The filter screen 102 is arranged on the second water inlet 1011. The second water outlet 1012 of the filter suction head assembly 100 is hermetically connected to the first water inlet 2011 of the pump chamber assembly 200. The filter suction head assembly 100 can be rotated relative to the pump chamber assembly 200 to adjust the direction of the second water inlet 1011, which is convenient to use.

Further, the filter suction head assembly 100 and the pump chamber assembly 200 are detachably connected, which facilitates assembly, disassembly, cleaning, and replacement of accessories.

Preferably, in the present embodiment, the filter suction head assembly 100 is snap-fitted with the pump chamber assembly 200, which has a simple structure and is easy to disassemble, but is not limited to this. In other embodiments, the filter suction head assembly 100 and the pump chamber assembly 200 can also be connected by other existing detachable structures.

Specifically, in the present embodiment, the pump chamber housing 201 is provided with the buckle 2015. The annular snap ring 1013 is provided in the second outlet 1012 of the suction head housing 101. The filter suction head assembly 100 is rotatably snap-fitted with the snap ring 1013 by the buckle 2015, and is thus detachably connected to the pump chamber assembly 200, and the filter suction head assembly 100 can rotate 360°, but not limited to this.

In the present embodiment, the number of the buckles 2015 is two or more, which are arranged at intervals to form a ring shape, forming a firmer connection and facilitating processing.

Preferably, in the present embodiment, the filter screen 102 has a curved surface structure and thus has good draining performance.

Further, in the present embodiment, the suction head housing 101 is provided with the cavity 1014 that is in fluid communication with the second water outlet 1012 and the second water inlet 1011. The exhaust hole 103 is formed on the cavity wall at the top of the cavity 1014, and the exhaust hole 103 is provided with a one-way air outlet valve structure to effectively solve the problem of trapped air and improve the pumping performance.

In the present embodiment, the one-way air outlet valve structure is realized by the exhaust valve 105 arranged in the exhaust hole 103 and the exhaust ball 104 movably arranged on the exhaust valve 105. FIG. 3 schematically shows the specific structure thereof, which has a simple structure and is less expensive, but not limited to this.

Preferably, in the present embodiment, the first water outlet 2013 is provided with a quick connector to facilitate disassembly and assembly of a drain pipe, which is convenient to use.

Specifically, in this embodiment, the quick connector includes the connector 205 and the lock nut 206. The connector 205 is rotatably connected to the lock nut 206, and the lock nut 206 is connected to the first water outlet 2013 by a thread so that the connector 205 and the first water outlet 2013 are hermetically and fixedly connected. The connector 205 can be various available connectors.

Furthermore, in the present embodiment, the one-way check valve 207 is further provided in the connector 205 to prevent the fluid in the pipeline from returning to the pump chamber after the submersible pump is stopped.

In use, when the capacitive liquid level sensor 301 detects that the water level reaches the start water level, the circuit board 302 controls the motor 303 to work to activate the horizontal automatic submersible pump to pump water. When the capacitive liquid level sensor 301 detects that the water level drops to the stop water level, the circuit board 302 delays for a period of time (such as 15 s, which ensures the draining property) and then controls the motor 303 to deactivate the horizontal automatic submersible pump to avoid dry turn, which is convenient to use and has high safety. Moreover, the horizontal automatic submersible pump employs the capacitive liquid level sensor, which has a simple structure, and is easy to implement, less expensive, highly reliable and suitable for long-term use.

Although the present invention has been specifically shown and described with reference to the preferred embodiments, those skilled in the art should understand that various changes made to the present invention in the forms and details without departing from the spirit and scope of the present invention as defined by the appended claims shall fall within the scope of protection of the present invention.

What is claimed is:

1. A horizontal automatic submersible pump, comprising a filter suction head assembly, a pump chamber assembly and a motor assembly;
wherein the pump chamber assembly comprises a pump chamber housing and a pump base, the pump chamber housing is provided with a first water outlet;
the motor assembly comprises at least one capacitive liquid level sensor, a circuit board, and a motor;
the at least one capacitive liquid level sensor is arranged inside a casing of the horizontal automatic submersible pump; the at least one capacitive liquid level sensor is configured to detect a liquid level outside the casing of the horizontal automatic submersible pump; an output terminal of the at least one capacitive liquid level sensor is connected to an input terminal of the circuit board;
a control terminal of the motor is connected to an output terminal of the circuit board; and
the circuit board is configured to control the motor to work or stop according to a detection signal of the at least one capacitive liquid level sensor;
wherein, the pump chamber assembly is provided with a first water inlet and a mounting port, wherein the first water inlet and the mounting port are in fluid communication with a pump chamber;
the filter suction head assembly is arranged on the first water inlet of the pump chamber assembly;
the motor assembly is hermetically arranged on the mounting port, and an impeller of the motor assembly extends into the pump chamber;
the first water outlet is in fluid communication with the pump chamber; and
the pump chamber housing is arranged on the pump base and rotates relative to the pump base to adjust a direction of the first water outlet;
wherein, the filter suction head assembly is provided with a second water outlet and a second water inlet; the second water outlet of the filter suction head assembly is hermetically connected to the first water inlet of the pump chamber assembly; and the filter suction head assembly rotates relative to the pump chamber assembly to adjust a direction of the second water inlet;
wherein, the filter suction head assembly is provided with a cavity in fluid communication with the second water outlet and the second water inlet; an exhaust hole is formed on a wall of the cavity, wherein the wall of the cavity is located at a top of the cavity; and the exhaust hole is provided with a one-way air outlet valve structure.

2. The horizontal automatic submersible pump according to claim 1, wherein, a number of the at least one capacitive liquid level sensor is two, and the two capacitive liquid level sensors are configured to detect a stop water level and a start water level, respectively; and the two capacitive liquid level sensors are arranged on the circuit board.

3. The horizontal automatic submersible pump according to claim 1, wherein, the pump base is provided with a through mounting cavity with two ends; one end of the pump chamber housing is rotatably installed in the through mounting cavity; and the pump chamber housing and the pump base are connected by a buckle.

4. The horizontal automatic submersible pump according to claim 1, wherein, the filter suction head assembly is detachably snap-fitted with the pump chamber assembly; the second water inlet of the filter suction head assembly is provided with a filter screen; and the filter screen has a curved structure.

5. The horizontal automatic submersible pump according to claim 3, wherein, the motor assembly is detachably and hermetically arranged on the mounting port.

6. The horizontal automatic submersible pump according to claim 5, wherein, the motor assembly is detachably and hermetically arranged on the mounting port by the motor assembly snap-fitting with the pump base.

7. The horizontal automatic submersible pump according to claim 1, wherein, a quick connector is provided on the first water outlet.

8. The horizontal automatic submersible pump according to claim 7, wherein, the quick connector comprises a connector, a lock nut and a one-way check valve, the connector is rotatably connected to the lock nut, and the lock nut is connected to the first water outlet by a thread.

* * * * *